United States Patent [19]

Stephenson, III et al.

[11] Patent Number: 5,485,234
[45] Date of Patent: Jan. 16, 1996

[54] LIGHT SOURCE INDICATOR FOR COMPACT CAMERA WITH COMBINATION FLIP-UP FLASH AND VIEWFINDER ASSEMBLY

[75] Inventors: Stanley W. Stephenson, III, Spencerport; Tom M. Seamans, Corfu, both of N.Y.

[73] Assignee: Eastman Kodak Company, Rochester, N.Y.

[21] Appl. No.: 243,019

[22] Filed: May 16, 1994

[51] Int. Cl.⁶ .................... G03B 15/03; G03B 15/02
[52] U.S. Cl. .................... 354/149.11; 354/127.11
[58] Field of Search ............ 354/149.1, 149.11, 354/288, 223, 289.1, 289.11, 289.12, 127.11

[56] References Cited

U.S. PATENT DOCUMENTS

| | | | |
|---|---|---|---|
| 4,804,992 | 2/1989 | Moriyama et al. | 354/471 |
| 5,005,032 | 4/1991 | Burnham | 354/149.11 |
| 5,175,581 | 12/1992 | Nishida et al. | 354/413 |
| 5,210,560 | 5/1993 | Labaziewicz | 354/268 |
| 5,233,378 | 8/1993 | Hosokawa et al. | 354/149.11 |
| 5,270,754 | 12/1993 | Newman | 354/149.11 |
| 5,361,120 | 11/1994 | Takami | 354/419 |

*Primary Examiner*—M. C. Gillner
*Assistant Examiner*—Nicholas J. Tuccillo
*Attorney, Agent, or Firm*—Roger A. Fields

[57] ABSTRACT

A compact camera comprises a flip-up flash unit which has a viewfinder opening for viewing a subject to be photographed when the flash unit is flipped up from a camera body to a use position, and a a pair of front and rear viewfinder lenses adapted to be raised from the camera body to viewing positions in optical alignment with the viewfinder opening when the flash unit is flipped up to its use position. According to the invention, a light source indicator is connected to the flash unit to point to the front viewfinder lens when the flash unit is flipped up to its use position and the pair of viewfinder lenses are raised to their viewing positions. The light source indicator provides a visible warning indication of some significant event or condition, such as flash ready, low battery, or inadequate prevailing light for a proper exposure.

5 Claims, 2 Drawing Sheets

LIGHT SOURCE INDICATOR FOR COMPACT CAMERA WITH COMBINATION FLIP-UP FLASH AND VIEWFINDER ASSEMBLY

FIELD OF THE INVENTION

The invention relates generally to the field of photography, and in particular to a compact camera with a combination flip-up flash and viewfinder assembly. More specifically, the invention relates to a light source indicator in the flip-up flash and viewfinder assembly which provides a visible warning indication of some significant event or condition, such as flash ready, low battery, or inadequate prevailing light for a proper exposure.

BACKGROUND OF THE INVENTION

Commonly assigned prior art U.S. Pat. Nos. 5,005,032, issued Apr. 2, 1991, and 5,270,754, issued Dec. 14, 1993, disclose a compact camera which has a flash unit adapted to be flipped up from a front face of the camera body for use and flipped down against the front face of the camera body for storage. A resiliently flexible back-support for the flash unit is constrained at respective front and rear pivot connections to the flash unit and the camera body to be flexed in opposite directions, when the flash unit is flipped up and down, to operate as an overcenter spring for urging the flash unit alternatively to flip up or down. The back-support carries a rear viewfinder lens which, together with a front viewfinder lens that is pivotally connected to the camera body, are flipped up into optical alignment with a viewfinder opening in the flash unit when the flash unit is flipped up and are flipped down for storage when the flash unit is flipped down.

Missing from this compact design, however, is a light source indicator that can be seen when looking through the viewfinder lenses and the viewfinder opening at a subject to be photographed. Typically, the light source indicator is used to provide a visible warning indication of some significant event or condition, such as flash ready, low battery, or inadequate prevailing light for a proper exposure. When a light source indicator is included in the camera viewfinder, it is customarily-fixed in relation to the viewfinder lenses.

SUMMARY OF THE INVENTION

According to one aspect of the invention a compact camera comprising a pair of front and rear viewfinder elements supported for movement between storage positions collapsed with respect to a camera body to store the pair of viewfinder elements and viewing positions erected with respect to the camera body to use the pair of viewfinder elements to view a subject to be photographed, is characterized in that:

a light source indicator is supported for movement between an indicating position erected with respect to the camera body and pointing towards the front viewfinder element to view the light source indicator together with a subject to be photographed, when the pair of viewfinder elements are in their viewing positions, and a concealed position collapsed with respect to the camera body to store the light source indicator, when the pair of viewfinder elements are in their storage positions.

According to another aspect of the invention a compact camera comprising a flip-up flash unit which has a viewfinder opening for viewing a subject to be photographed when the flash unit is flipped up from a camera body to a use position, and a a pair of front and rear viewfinder lenses adapted to be raised from the camera body to viewing positions in optical alignment with the viewfinder opening when the flash unit is flipped up to its use position, is characterized in that:

a light source indicator is connected to the flash unit to point to the front viewfinder lens when the flash unit is flipped up to its use position and the pair of viewfinder lenses are raised to their viewing positions.

DETAILED DESCRIPTION OF THE INVENTION

The invention is described as being embodied in a compact camera with a combination flip-up flash and viewfinder assembly. Because such photographic cameras have become well known as typified by prior art U.S. Pat. Nos. 5,005,032, and 5,270,754, this description is directed in particular to camera elements forming part of or cooperating directly with the preferred embodiment. It is to be understood, however, that camera elements not specifically shown or described may take various forms known to persons of ordinary skill in the art.

Figure 1:
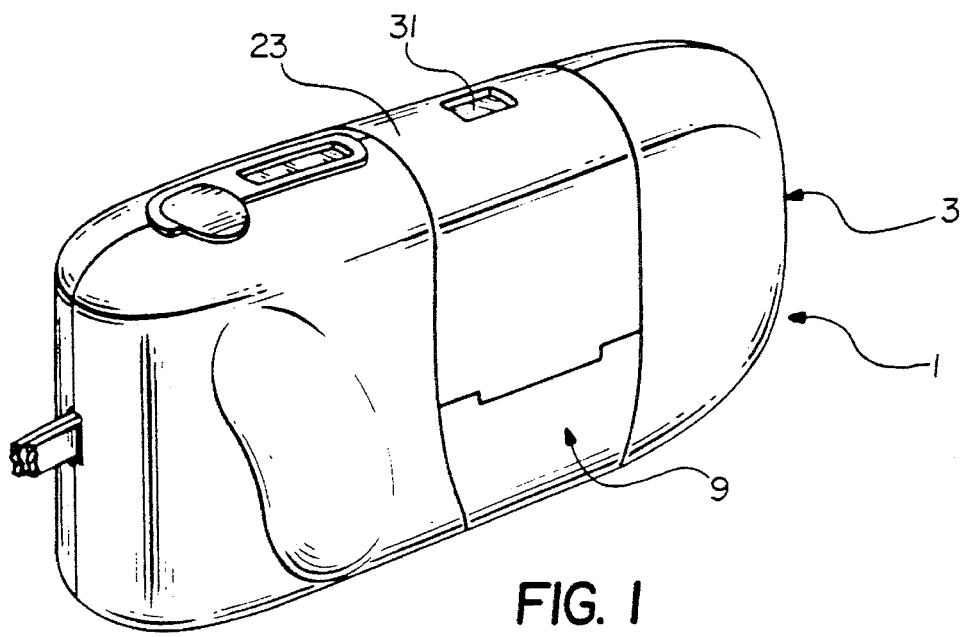
FIG. 1 is a front perspective view of a compact camera with a combination flip-up flash and viewfinder assembly according to a preferred embodiment of the invention, showing the flash and viewfinder assembly unit in a folded or storage position.
Figure 2:
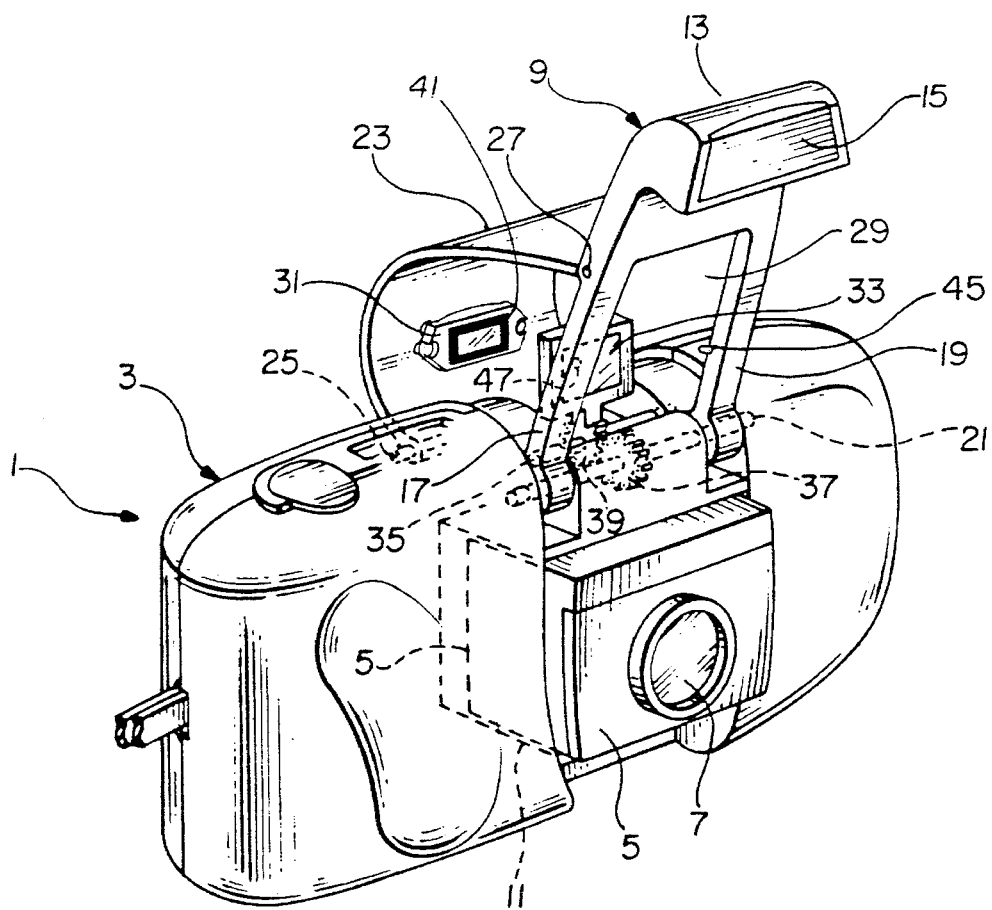
FIG. 2 is a front perspective view similar to FIG. 1, showing the flash and viewfinder assembly in a non-folded or use position.

Referring now to the drawings, FIGS. 1 and 2 show a compact 35 mm camera 1 comprising a contoured camera body 3, a lens carrier 5 for an objective (taking) lens 7 and a flip-up flash unit 9.

Figure 3:
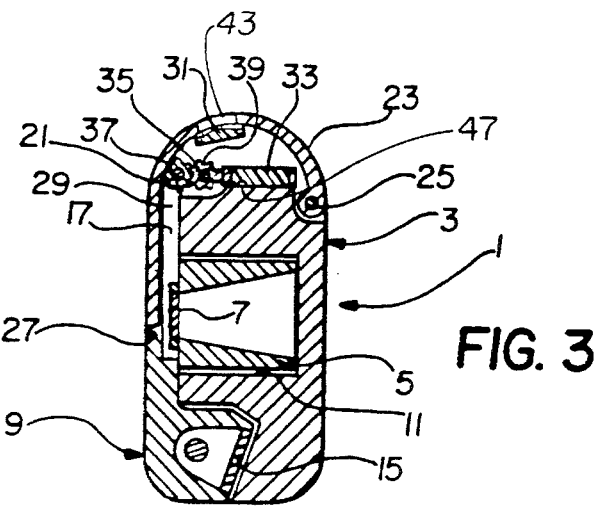
FIGS. 3, 4 and 5 are side elevation section views of the compact camera, showing progressive movement of the flash and viewfinder assembly from its storage position to its use position.
Figure 5:
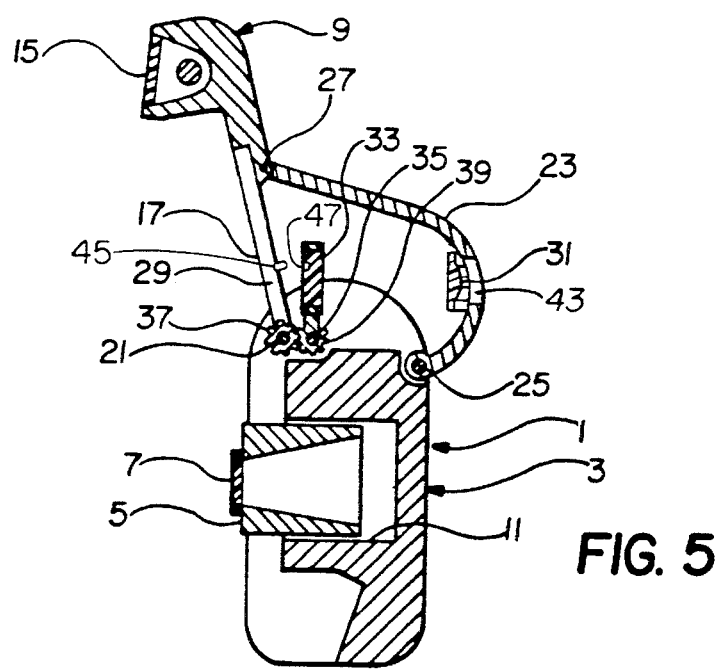

The lens carrier 5 is supported in a light-tight channel 11 in the camera body 3 for translation outwardly and inwardly of the camera body, along the lens's optical axis (not shown), between an extended picture-taking position shown in FIGS. 2 and 5 and a retracted storage position shown in FIG. 3. A compression spring (not shown) urges the lens carrier 5 to its picture-taking position, and known stops (not shown) prevent translation of the lens carrier outwardly beyond that position. Alternatively, the lens carrier 5 can be supported for movement between its picture-taking and storage position as shown in prior art U.S. Pat. No. 4,557,571, issued Dec. 10, 1985.

The flash unit 9 includes a flash emission window 15 and a pair of spaced rigid legs 17 and 19. The rigid legs 17 and 19 are pivotally connected to the camera body 3 by means of a coaxial pin 21 to support the flash unit 9 for manual swinging movement about the coaxial pin between a folded storage position in front of the objective lens 7 when the lens carrier 5 is in its storage position shown in FIG. 3 and a non-folded use position elevated from the camera body when the lens carrier is in its picture-taking position shown in FIGS. 2 and 5. As the flash unit 9 is manually flipped down from its use position to its storage position, the rigid legs 17 and 19 move against the lens carrier 5 to push the lens carrier further into the channel 11 from its picture-taking position to its storage position. See FIGS. 3–5.

A separate thin support or cover part 23 is pivotally connected to the camera body 3 by means of an axial pin 25 and is pivotally connected to the rigid legs 17 by respective coaxial pins 27. This connection causes the support part 23 to act as a rear support or brace for the flash unit 9 when the flash unit is in its use position shown in FIGS. 2 and 5 and to act as a lid or cover for an open space 29 between the rigid legs 17 and 19 when the flash unit is in its storage position shown in FIGS. 1 and 3. The supporting part 23 is resiliently flexible, i.e. spring-like, and since it is constrained at opposite ends by the axial pin 25 and the coaxial pins 27, it will be flexed along its length in opposite directions when the flash unit 9 is flipped up and down. Consequently, the supporting part 23 will operate as an overcenter spring to urge the flash unit 9 alternatively to the storage and use positions when it is flexed beyond an overcenter, i.e. mid, position (not shown).

The open space 29 between the rigid legs 17 and 19 of the flash unit 9 is located to act as a front viewfinder opening for viewing a subject to be photographed when the flash unit is in its use position shown in FIGS. 2 and 5. To enhance the view of the subject, the supporting part 23 carries a finder eye-lens (rear lens) 31 which is moved via the supporting part between a collapsed folded or storage position shown in FIG. 3 and an erect viewing position shown in FIGS. 2 and 5, when the flash unit 9 is flipped down and up between its storage and use positions. In addition, a finder front-lens 33 is pivotally connected to the camera body 3 by means of an axial pin 35 to support the finder front-lens for swinging movement about the axial pin between a collapsed folded or storage position shown in FIG. 3 and an erect viewing position shown in FIGS. 2 and 5. Respective gears 37 and 39 fixed to the axial pins 21 and 35 for the flash unit 9 and the finder front-lens 33 continuously engage to swing the finder front-lens from its folded position to its viewing position responsive to flipping up the flash unit 9 from its storage position to its use position. See FIGS. 3–5. Conversely, the gears 37 and 39 swing the finder front lens 33 from its viewing position to its folded position responsive to flipping down the flash unit from its use position to its storage position. When the flash unit 9 is in its use position shown in FIGS. 2 and 5, the finder front-lens 33 is located between the open space 29 and the finder eye-lens 31 in optical alignment with the open space and the finder eye-lens. Thus, one views a subject by looking through the finder eye-lens 31, the finder front-lens 33, and the open space 29.

Figure 4:
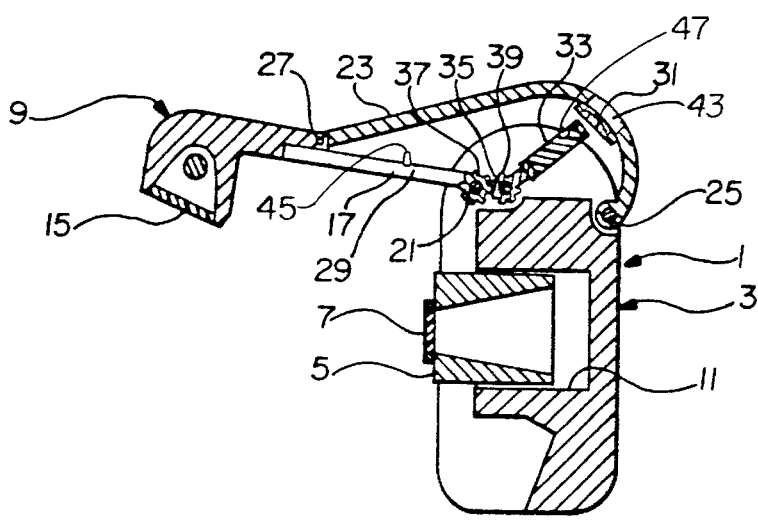

The finder eye-lens 31 as is typical is non-flexible and has a viewfinder frame 41 painted on it. The supporting part 23 has a rear viewfinder opening 43 behind the finder eye-lens 31 as shown in FIGS. 3–5.

According to the invention, a light source indicator, preferably a conventional red-glowing light-emitting diode (LED) 45, is partially embedded in the rigid leg 19 of the flash unit 9 at a location slightly within the open space 29 to obliquely point to the finder front-lens 33 when the flash unit is in its use position and the finder front-lens and the finder eye-lens 31 are in their viewing positions as shown in FIG. 2. A hemispherical cavity (or protrusion) 47 is provided in the finder front-lens 33 in line with the LED 45 to visible appear as an illuminated red-colored dot when one looks through the finder eye-lens 31, the finder front-lens 33, and the open space 29, and the LED 45 is activated. The LED 45, when activated, is intended to serve as a warning indication of some significant event or condition, such as flash ready, low battery, or inadequate prevailing light for a proper exposure.

When the flash unit 9 is in its use position and the finder front-lens 33 and the finder eye-lens 31 are in their viewing positions as shown in FIG. 3, the LED 45 faces into the camera body 3 to be in a concealed position.

The invention has been described with reference to a preferred embodiment. However, it will be appreciated that various modifications can be effected within the ordinary skill in the art without departing from the scope of the invention. For example, the LED 45 can be located within or without the field of view of the finder eye-lens 31 and the finder front-lens 33 as long as the LED is pointed to the cavity 47 in the finder front-lens to provide the illuminated red-colored dot when the LED is activated. The advantage in locating the LED 45 outside the field of view of the finder eye-lens 31 and the finder front-lens 33 is that it cannot be seen directly.

PARTS LIST 1. compact camera
3. camera body
5. lens carrier
7. objective lens
9. flash unit
11. channel
15. flash emission window
17. rigid leg
19. rigid leg
21. coaxial pin
23. support or cover part
25. axial pin
27. coaxial pins
29. open space
31. finder eye-lens
33. finder front-lens
35. axial pin
37. gear
39. gear
41. viewfinder frame
43. rear viewfinder opening
45. LED
47. cavity

We claim:

1. A compact camera comprising a pair of front and rear viewfinder elements supported for movement between storage positions collapsed with respect to a camera body to store said pair of viewfinder elements and viewing positions erected with respect to said camera body to use the pair of viewfinder elements to view a subject to be photographed, is characterized in that:

a light source indicator is supported for movement between an indicating position erected with respect to said camera body and pointing towards said front viewfinder element to view said light source indicator together with a subject to be photographed, when said pair of viewfinder elements are in their viewing positions, and a concealed position collapsed with respect to said camera body to store said light source indicator, when said pair of viewfinder elements are in their storage positions.

2. A compact camera as recited in claim 1, further characterized in that:

means connects said pair of viewfinder elements and said light source indicator for erecting the pair of viewfinder elements to their viewing positions when the light source indicator is erected to its indicating position and for collapsing the pair of viewfinder elements to their storage position when the indicator light source is collapsed to its concealed position.

3. A compact camera as recited in claim 1, wherein said front viewfinder element includes an integral surface irregularity located to be in line with said light indicator source when said pair of viewfinder elements are in their viewing positions and the light source indicator is erected to its indicating position.

4. A compact camera comprising a flip-up flash unit which has a viewfinder opening for viewing a subject to be photographed when said flash unit is flipped up from a camera body to a use position, and a pair of front and rear viewfinder lenses adapted to be raised from said camera body to viewing positions in optical alignment with said viewfinder opening when said flash unit is flipped up to its use position, is characterized in that:

a light source indicator is connected to said flash unit for movement to point to said front viewfinder lens only when the flash unit is flipped up to its use position and said pair of viewfinder lenses are raised to their viewing positions.

5. A compact camera as recited in claim 4, wherein said light source indicator is located within said viewfinder opening.

* * * * *